United States Patent Office
3,129,323
Patented Apr. 14, 1964

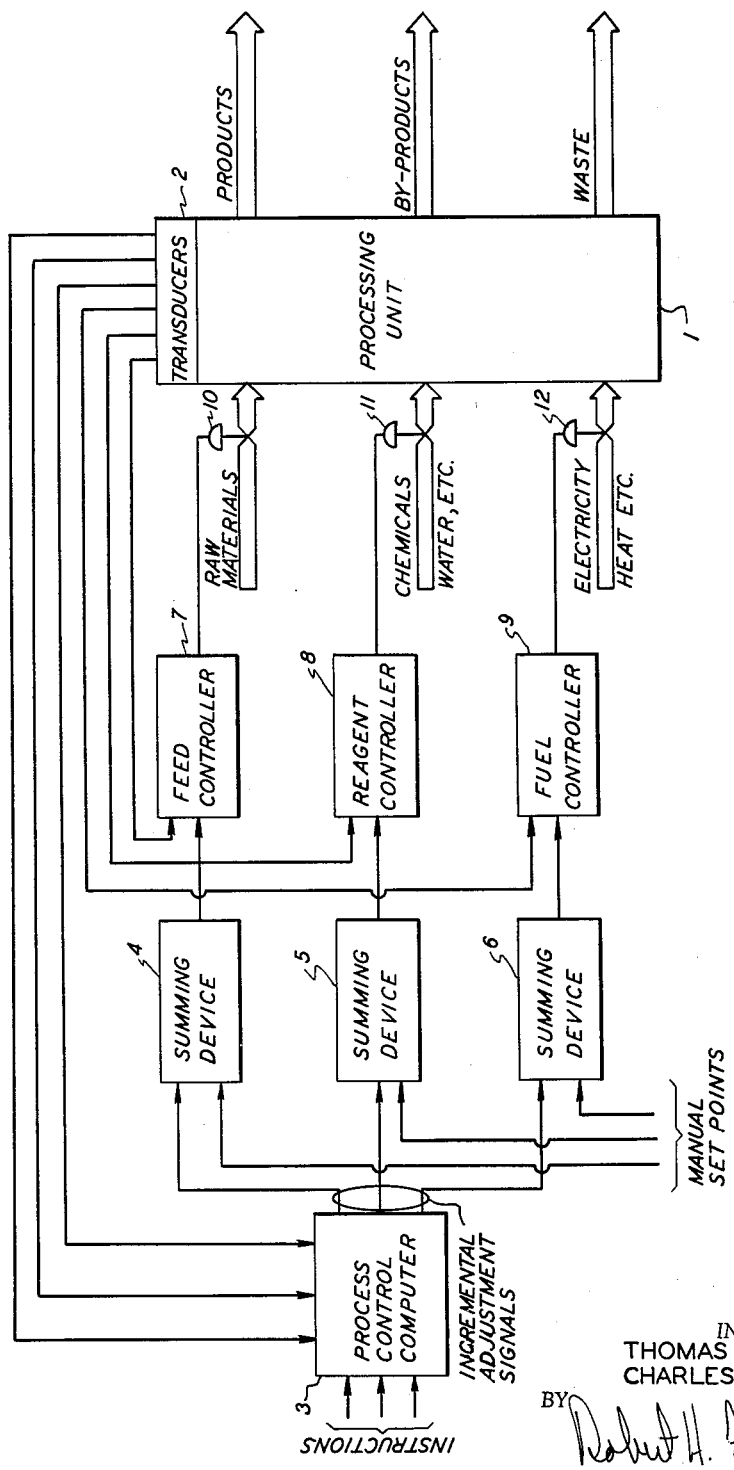

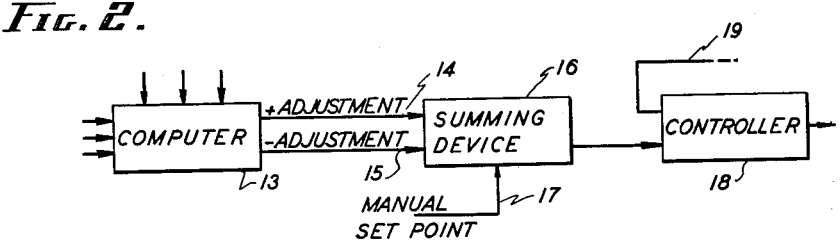
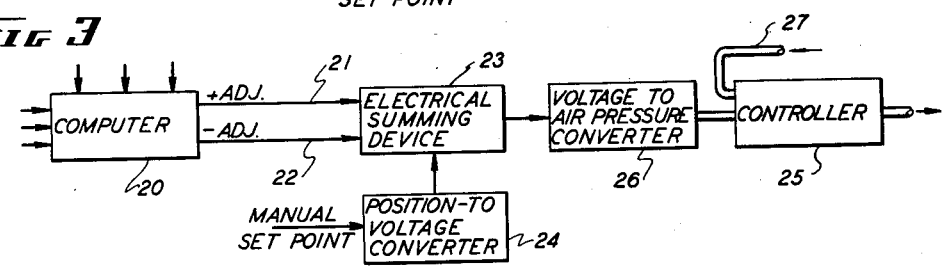
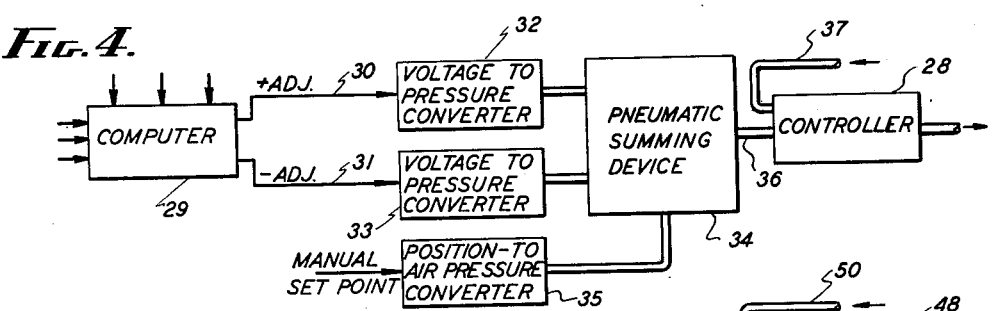
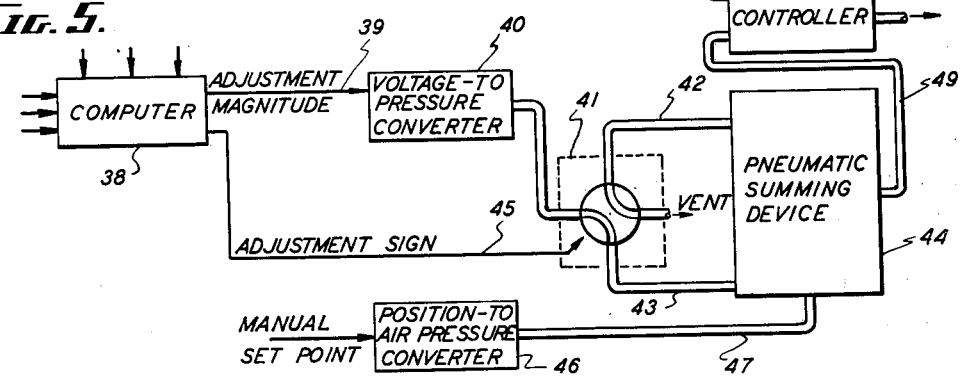

3,129,323
FAIL-SAFE PROCESS CONTROL SYSTEM
Thomas M. Stout and Charles G. Laspe, Rolling Hills, Calif., assignors, by mesne assignments, to Thompson Ramo Wooldridge Inc., Cleveland, Ohio, a corporation of Ohio
Filed Mar. 26, 1958, Ser. No. 724,110
9 Claims. (Cl. 235—151)

This invention relates to process control systems and more particularly to a fail-safe system for controlling a process in which a digital computer determines the adjustment of at least one process variable.

In a process of manufacture it is desirable to produce a maximum amount of a product of a specified quality at a minimum cost. Even if all of the underlying technical and economic factors are understood, it is difficult to keep the process adjusted manually for optimum performance in the face of changing raw material characteristics and environmental conditions. A process control computer, however, is capable of monitoring a process in accordance with complex relationships on a continuous basis. Accordingly, it is well known to employ a digital computer in a process control system in which the process variables are regulated in accordance with information supplied by the computer.

A process control computer may be arranged to receive information indicating the actual mode of operation of the process along with external instructions relating to the optimum mode of operation of the process and to supply information for the regulation of the process variables to achieve the optimum performance. Under the influence of the computer, conventional controllers may be employed to translate the information supplied by the computer into an adjustment of the process variables so that a truly automatic process control system is achieved.

Although most digital computers are highly reliable, there is always the chance of an occasional computer failure. In order to indicate such a failure an alarm system may be built into the process for notifying an operator of the necessity to assume control of the process or to shut the process down. However, in many types of manufacturing processes, provision of an alarm system is unsatisfactory and it is desirable to provide some secondary form of control which will take over in the absence of the computer.

Accordingly, it is one object of the present invention to provide a new and improved fail-safe process control system.

It is another object of the present invention to provide a process control system in which preset manual set points control the process variables in the event of a failure in operation of a process control computer.

It is yet another object of the invention to provide a process control system in which the process variables are adjusted in accordance with the combination of preset manual set points and incremental adjustments supplied by a process control computer.

Briefly, the process control system of the invention includes a summing device for receiving a manual set point, a process control computer supplies an incremental adjustment to the summing device, a signal is generated by the summing device corresponding to the combination of the manual set point and the incremental signal from the computer, and a controller is connected to the summing device for maintaining a process variable at a predetermined level corresponding to the signal supplied by the summing device. Thus, the manual set point applied to the summing device may be chosen to correspond to a desirable level of operation of the process variable in the event of a computer failure while the computer supplies an incremental adjustment signal which when combined with the manual set point affords an optimum setting for the process variable.

In a particular embodiment of the invention, a plurality of process variables are each controlled by a separate controller, a plurality of transducers are connected to the process for generating signals indicating the operation of the process, the signals from the transducers are applied to a digital process control computer along with instructions for operation of the process, the digital computer performs a computation in accordance with the transducer signals and the instructions and generates a plurality of incremental output signals which are applied to a plurality of summing devices, and manual set points are applied to each of the summing devices so that the controllers establish a level of operation of each of the process variables in accordance with the combination of the manual set points and the incremental signals from the computer. Accordingly, during operation of the process, the computer establishes an optimum level of operation of each of the process variables in accordance with the instructions, and in the event of a computer failure, the controllers establish the process variables at levels corresponding to the manual set points applied to the summing devices.

A better understanding of the invention may be had from a reading of the following detailed description and an inspection of the drawings, in which:

FIG. 1 is a diagrammatic illustration of a process control system in accordance with the invention;

FIG. 2 is a block diagram of an arrangement of a computer, a summing device and a controller for use in accordance with the invention;

FIG. 3 is a block diagram of a portion of a process control system in which pneumatic signals corresponding to electrical signals from a summing device are applied to a pneumatic controller;

FIG. 4 is a block diagram of a portion of a process control system in accordance with the invention in which pneumatic signals corresponding to electrical signals from a computer and a manual set point are applied to a pneumatic summing device and a pneumatic controller; and FIG. 5 is a combined block and diagrammatic illustration of a portion of a process control system in accordance with the invention in which pneumatic signals corresponding to electrical signals from a computer are directed to a selected input of a pneumatic summing device via a solenoid operated valve with a pneumatic controller being connected to the summing device.

FIG. 1 is a process control system for adjusting the process variables in a process illustrated generally as a process unit 1. The process unit 1 is arranged to receive materials, chemicals, water, electricity, heat, etc. to produce products, by-products and waste as illustrated. It will be understood that the process unit 1 is intended to be a general representation of a process having a plurality of process variables to be controlled. Accordingly, the process control system illustrated in FIG. 1 may be employed to advantage in controlling variable parameters other than those illustrated which are subject to automatic control.

In order to derive information representing the level of process operation, a plurality of transducers 2 may be connected to various points in the process for measuring such variables as temperature, rate of flow, chemical composition, etc. A portion of the information derived from the transducers 2 is fed back to a process control computer 3 which also receives instructions and programming information from an external source. The instructions may be supplied concurrently with the operation of the process or may be introduced and internally stored within the computer 3. The instructions may include data required for the process control computer 3 to perform a computation or manipulation on the information derived from the transducers 2 to generate output signals establishing optimum levels of a plurality of process variables.

A general description of one process control computer for use in the system of the invention may be found in the following publications, copies of which are on file in the Patent Office, "RW-300 Preliminary Programming Manual," dated December 31, 1957; article entitled "New Digital Computer Especially Designed for Process Control," by D. H. Stormont, appearing in the September 2, 1952, issue of the Oil and Gas Journal; article entitled "Computer Can Run Process," appearing in the October, 1957, issue of Chemical Engineering; and an article entitled "System Characteristics of a Computer Controller for Use in the Process Industries," by Frady and Phister, appearing in the Proceedings of the Eastern Joint Computer Conference, December 1957.

The output signals from the computer 3 are fed to a plurality of summing devices 4, 5 and 6 which are adapted to combine the output signals from the computer 3 with manual set point signals. The manual set point signals may be supplied either from an external source or internally generated within the summing devices 4, 5 and 6. Since the computer 3 is arranged to provide output signals which represent an incremental adjustment in the process variables departing from the manual set points, the manual set points may be introduced to the computer as an instruction. By selecting the manual set points to represent a compromise operation of the process in the absence of the process control computer 3, the process control computer 3 provides incremental process adjustment signals to afford an optimum process operation. However, in the event of a computer failure, the summing devices 4, 5 and 6 provide signals corresponding to the manual set points for a continuation of the process at a suitable operation level so that the failure of the computer does not result in a complete shutdown of the process.

The output signals from the summing devices 4, 5 and 6 are translated into an adjustment of the process variable by means of a plurality of controllers. For example, a feed controller 7, a reagent flow controller 8, and a fuel controller 9 may each comprise a conventional null balance servo system which receives signals from the transducers 2 representing the level of operation of the particular process variable to be adjusted. By comparing the signals from the transducers 2 with the signals provided by the summing devices 4, 5 and 6, the controllers 7, 8 and 9 adjust a plurality of solenoid operated valves 10, 11 and 12 until the signals provided by the transducers 2 indicate that the process variable is properly adjusted. Thus, through the combination of the manual set points and the incremental adjustment signals from the computer 3, the valves 10, 11 and 12 are adjusted to insure an optimum operation of the process unit 1.

FIG. 2 illustrates a portion of a process control system in which a signal provided by a computer 13 on an upper lead 14 represents a positive adjustment of the process variable while a signal provided by the computer 13 on the lower lead 15 represents a negative adjustment of the process variable. A summing device 16 may be arranged to receive the signals 14 and 15 along with a manual set point signal on the lead 17 to generate an output signal corresponding to the desired level of operation of the process variable. As before, the output from the summing device 16 may be connected to a controller 18. The controller 18 functions to adjust the process variable in a manner similar to that described above in connection with FIG. 1 until the signal on a lead 19 indicates a proper adjustment of the process variable.

In order to illustrate the manner in which an electrically operating process control computer may be used in a process control system in which the controllers operate pneumatically, FIG. 3 illustrates a portion of a process control system including a computer 20 which is adapted to receive both instructions and process information and provide output signals on the leads 21 and 22 corresponding to an adjustment of the process variable. An electrical summing device 23 receives the electrical signals from the computer 20 along with an electrical signal from a position-to-voltage converter 24.

Connected to the input of the position-to-voltage converter 24 is a mechanical element which may be set manually to correspond to a desired compromise set point. The position-to-voltage converter 24 then generates an electrical signal corresponding to the position of the mechanical element. For example, the position-to-voltage converter 24 may comprise a conventional potentiometer having a movable contactor linked to a mechanical element representing the manual set point. The electrical summing device 23 provides an output signal representing the desired adjustment of a process variable by means of an electrical signal. A pneumatic controller 25 may be linked to a valve (not shown) or other means for controlling a process variable pneumatically. The pneumatic controller may be a conventional pneumatic servo system which receives an air pressure signal via a conduit 27 derived from a transducer linked to the process, along with an air pressure signal from a voltage-to-air pressure converter 26 corresponding to the electrical signal from the electrical summing device 23. Thus, the apparatus of FIG. 3 applies a pressure signal to a conventional pneumatic controller in accordance with electrical signals from a process control computer.

Another arrangement for establishing a control over a pneumatic process controller 28 from a process control computer 29 is illustrated in FIG. 4 in which incremental adjustment signals from the computer 29 are provided on the leads 30 and 31. Each of the electrical signals on the leads 30 and 31 is converted to air pressure by means of the voltage-to-pressure converters 32 and 33. Each of the voltage-to-air converters 32 and 33 provides a pneumatic signal in the form of an air pressure to a pneumatic summing device 34. In addition to the incremental adjustment pressures from the converters 32 and 33, the pneumatic summing device 34 receives a pneumatic signal from a position-to-air pressure converter 35 corresponding to a manual set point. For example, the position-to-air pressure converter 35 may comprise a variable pressure valve having its control element mechanically linked to a mechanical element representing the manual set point. Thus, the pneumatic summing device 34 provides a pressure signal in the conduit 36 which is applied to the controller 28. As in the case of FIG. 3, the controller 28 may be arranged to operate a valve or other means of controlling a process variable and to receive a pressure signal from the conduit 37 corresponding to the desired level of operation of the process variable. The controller 28 operates to adjust the process variable until the pneumatic signal from the conduit 37 indicates a proper adjustment of the process variable.

In the arrangement of FIG. 5, the computer 38 is adapted to provide an output signal which is proportional in magnitude to a desired incremental adjustment and a signal which indicates the direction or sense of the desired incremental adjustment. The signal appearing on the lead 39 representing the magnitude of the incremental adjustment may be changed to a pressure signal by means of a voltage-to-pressure converter 40 and applied to a solenoid operated valve 41. The solenoid operated valve is connected to a pair of output conduits 42 and 43 which are connected to a pneumatic summing device 44.

When the air pressure from the voltage-to-pressure converter 40 is directed to the pneumatic summing device 44 via the conduit 42, the direction of adjustment of the process variable is in one given direction and when the signal from the voltage-to-air pressure converter 40 is directed to the pneumatic summing device 44 via the conduit 43, the direction of adjustment of the process variable is in the opposite direction. The solenoid operated valve 41 functions to direct the signal from the voltage-to-air pressure converter 40 to a desired one of the conduits 42 and 43 in accordance with an electrical signal supplied by the computer 38 on a lead 45 which actuates the solenoid of the valve 41. The manual set point is introduced in the pneumatic summing device 44 of FIG. 5 by means of a position-to-air pressure converter 46 which converts the position of a mechanical element to an air pressure in a conduit 47 representing the compromise set point at which the process variable is to be set in the event of a computer failure.

The output of the pneumatic summing device 44 is applied to a conventional pneumatic controller 48 via a conduit 49 which adjusts the process variable until the signal derived from the process and applied to the controller input via the conduit 50 indicates a proper adjustment of the process variable.

In each of the above illustrative embodiments, the various blocks represent presently available pieces of apparatus. For example, the process control computer 3 may be any of a number of special purpose or general purpose computers now employed in the automatic control field, such as the computer manufactured by the Thompson Ramo Wooldridge Corporation, the present assignees of this invention, and identified as "RW300." This particular computer, and most of the computers used in the field, have self-contained, standard digital-to-analog, and analog-to-digital converters, as input and output circuits. These converters take a number of conventional forms, as described in chapter 11 entitled "Analog-to-Digital and Digital to Analog Converters" of the book entitled "Digital Computer Components and Circuits" by R. K. Richards, published by the D. Van Nostrand Company, Inc. of Princeton, New Jersey, in November 1957. These converters function in response to the analog signals from the transducers 2 to provide digital signals to be handled by the process control computer 3. They also function to convert the digital results to analog form for delivery to the various analog summing devices heretofore described. Transducers for measuring parameters of the processing unit are likewise conventional. For example, a thermistor bridge arrangement may be employed to obtain an electrical output proportional to a measured temperature, a potentiometer whose movable contact is positioned by the angle taken by a spring-loaded vane disposed in a moving stream may be employed to measure the rate of flow, and other devices for measuring a physical condition and producing an output voltage proportional to the magnitude of the measured condition may be used. However, by interconnecting these known pieces of apparatus in accordance with the invention, there may be achieved a computer adjustment of a plurality of process variables, a manual adjustment of the process variables, a satisfactory operation in the event of an accidental computer error, malfunction, or failure, and a satisfactory operation in the event of a deliberate shutdown of the computer for testing, repairs, modifications, etc. Since the system uses standard components whose reliability has been established, and which are accepted in the process industries, the process control system of the invention affords a means for introducing the optimum operation of a process under the control of a process control computer without danger of costly shutdowns or losses of materials incurred through computer failure.

What is claimed is:

1. A process control system including the combination of a process unit having at least one process variable, means coupled to the process unit for adjusting the process variable to control the operation of the process, means for sensing at least one process variable, a controller coupled to the adjusting means for establishing a process variable at a predetermined level in accordance with the comparison of a controllable set point signal and a signal representing a measurement of at least one process variable, a summing device connected to the controller for providing a controllable set point signal, said summing device having one input circuit for receiving a manual set point signal and a second input circuit for receiving an incremental adjustment signal, and a computer connected to the second input circuit of the summing device to provide an incremental adjustment signal to the summing device which is combined with the manual set point signal to provide a controllable set point signal to the controller for establishing the process variable at a desired level of operation.

2. A process control system including the combination of a process unit, a process control computer for receiving instructions and signals representing process operation, a summing device coupled to the computer, means for introducing a manual set point to the summing device, a controller connected to the summing device, means coupled between the controller and the process unit for adjusting a process variable, and at least one transducer connected between the process unit and the computer for transmitting information signals therebetween whereby the computer applies an incremental adjustment signal to the summing device to establish at least one process variable at an optimum level of operation and whereby the summing device applies a signal to the controller to establish a compromise manually set level of operation of the process variable in the absence of an incremental adjustment signal from the computer.

3. A computer having a plurality of inputs and at least one output circuit for providing incremental adjustment signals in accordance with a predetermined relationship of input signals, a summing device to which the incremental adjustment signals from the computer are applied, means for applying at least one manual set point signal to said summing device to establish a manual set point of operation, a controller, said summing device being adapted to apply to the controller a controllable set point signal representing the combination of incremental adjustment signals and the manual set point signal, means for adjusting a process variable connected to the controller, means applying a signal to the controller representing a process variable, said controller being adapted to compare the controllable set point signal from the summing device with the signal representing the measurement of the process variable to adjust the process variable to a desired level, whereby in the event of a computer failure, the summing device applies a signal to the controller to establish the process variable at a compromise level of operation.

4. Apparatus in accordance with claim 3 in which the controller is a pneumatic device which is actuated by air pressure, the summing device is an electrical device which receives electrical signals, and a voltage-to-air pressure converter is connected between the electrical summing device and the pneumatic controller.

5. Apparatus in accordance with claim 4 in which the manual set point signal is represented by the position of a mechanical element and a position-to-voltage converter is connected between the mechanical element and the electrical summing device.

6. Apparatus in accordance with claim 3 in which the controller and summing device are pneumatic devices which are actuated by air pressure, the computer is an electrical device which receives electrical signals, and a voltage-to-air pressure converter is connected between the computer and the pneumatic summing device to supply a pneumatic signal corresponding to the electrical output signal of the computer.

7. Apparatus in accordance with claim 6 in which the manual set point is represented by the position of a mechanical element and a position-to-air pressure converter is connected between the manual set point and the pneumatic summing device for applying a pneumatic signal to the pneumatic summing device in accordance with the setting of the mechanical element.

8. A process control system for supplying a pneumatic signal to a process controller including the combination of an electrical computer which is adapted to receive a plurality of input signals, a first output circuit connected to the computer which receives electrical signals from the computer representing the magnitude of an adjustment to be made in a process variable, a second output circuit connected to the computer which is adapted to receive an electrical signal representing the direction of an adjustment to be made in the process variable, a solenoid operated valve having at least two outlets for directing a pneumatic signal to a selected one of the two outlets in response to an electrical signal, means for actuating said solenoid operated valve in response to an electrical signal, a voltage-to-pressure converter connected between the first computer output circuit and the solenoid operated valve to provide a pneumatic signal corresponding to the magnitude adjustment indicated by an electrical signal in the first computer output circuit, means applying the electrical signal appearing in the second computer output circuit to the actuating means of the solenoid operated valve for switching the pneumatic signal from the voltage-to-pressure converter to a selected one of said two outlets, a pneumatic summing device connected to the outlets of the solenoid operated valve, means for applying a pneumatic signal representing a manual set point to the summing device, and means coupling the pneumatic summing device to the process controller for adjusting a process variable in accordance with the combination of the manual set pneumatic signal and the electrical signal supplied by the computer.

9. Apparatus in accordance with claim 8 in which the pneumatic manual set point signal applying means comprises a mechanical element and a position-to-air pressure converter connected between the mechanical element and the pneumatic summing device whereby so long as the computer remains in operation the pneumatic summing device causes the process controller to adjust the process in accordance with the combination of the pneumatic adjustment signal and the pneumatic manual set point signal and when the computer fails in operation the pneumatic summing device causes the controller to establish the process variable at a level of operation indicated by the manual set point signal.

References Cited in the file of this patent

UNITED STATES PATENTS

| | | |
|---|---|---|
| 2,829,322 | Silva | Apr. 1, 1958 |
| 2,932,471 | Exner et al. | Apr. 12, 1960 |

OTHER REFERENCES

Automation, March 1955, pp. 37–39 ("Block Diagrams Symbols and Control Combinations").

Control Engineering, vol. 4, June 1957, pp. 129–136 ("Fitting the Digital Computer Into Process Control" by M. Phister and E. Grabbe).

Control Engineering, vol. 4, August 1957, pp. 72–76 ("Analyzing an Arc Furnace Control System" by Kogen).